3,056,813
NOVEL 15-HALO-16-ALKYL STEROIDS AND
PROCESSES
David Taub, Metuchen, and Norman L. Wendler, Summit,
N.J., assignors to Merck & Co., Inc., Rahway, N.J., a
corporation of New Jersey
No Drawing. Filed Aug. 19, 1960, Ser. No. 50,584
20 Claims. (Cl. 260—397.45)

This invention relates to novel steroid compounds. More specifically, this invention relates to 15-halo-16-alkyl-17α-hydroxy pregnene and pregnadienediones and triones of the formula:

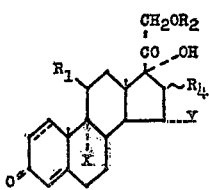

in which $R_1$ may be keto or β-hydroxyl, $R_2$ may be hydrogen or lower alkanoyl, $R_4$ may be α-alkyl or β-alkyl, X may be hydrogen or halogen, Y is a halogen and the dotted line between carbons No. 1 and No. 2 shows that that bond may be either a single or a double bond.

The 15-halo-16-alkyl steroids produced in accordance with the present invention possess extremely high anti-inflammatory activity, considerably greater than that of the parent steroids, and are especially effective for the treatment of arthritis and related diseases since they can be administered for their cortisone-like action in low dosage thereby minimizing undesired side effects.

Of the compounds of our invention, those having a 1,4-diene structure are prepared as described in the schematic flow sheet in Table 1. Among the materials which may be used as a starting material in the process described in Table 1 are 16α-methyl-1,4-pregnadiene-17α,21-diol-3,11,20-trione-
16β-methyl-1,4-pregnadiene-17α,21-diol-3,11,20-trione,
16α-ethyl-1,4-pregnadiene-17α,21-diol-3,11,20-trione,
16β-ethyl-1,4-pregnadiene-17α,21-diol-3,11,20-trione,
16α-propyl-1,4-pregnadiene-17α,21-diol-3,11,20-trione,
16β-propyl-1,4-pregnadiene-17α,21-diol-3,11,20-trione,
16α-methyl-1,4-pregnadiene-11β,17α,21-triol-3,20-dione,
16β-methyl-1,4-pregnadiene-11β,17α,21-triol-3,20-dione,
16α-ethyl-1,4-pregnadiene-11β,17α,21-triol-3,20-dione,
16β-ethyl-1,4-pregnadiene-11β,17α,21-triol-3,20-dione,
16α-butyl-1,4-pregnadiene-11β,17α,21-triol-3,20-dione,
16β-butyl-1,4--pregnadiene-11β,17α,21-triol-3,20-dione,
9-halo-16-alkyl-1,4-pregnadiene-17α,21-diol-3,11,20-trione,
9α-fluoro-16α-butyl-1,4-pregnadiene-16α,21-diol-3,11,20-trione;
9α-fluoro-16α-methyl-1,4-pregnadiene-17α,21-diol-3,11,20-trione,
9α-fluoro-16β-methyl-1,4-pregnadiene-17α,21-diol-3,11,20-trione,
9α-chloro-16α-methyl-1,4-pregnadiene-17α,21-diol-3,11,20-trione,
9α-chloro-16β-methyl-1,4-pregnadiene-17α,21-diol-3,11,20-trione,
9α-fluoro-16α-ethyl,
1,4-pregnadiene-17α,21-diol-3-11,20-trione,
9α-fluoro-16β-ethyl-1,4-pregnadiene-17α,21-diol-3,11,20-trione,
9α-fluoro-16α-propyl-1,4-pregnadiene-17α,21-diol-3,11,20-trione,
9α-fluoro-16β-propyl-1,4-pregnadiene-17α,21-diol-3,11,20-trione,
9-halo-16-alkyl-1,4-pregnadiene-11β,17α,21-triol-3,20-dione,
9α-fluoro-16β-butyl-1,4-pregnadiene-17α,21-diol-3,11,20-trione,
9α-fluoro-16α-methyl-1,4-pregnadiene-11β,17α,21-triol-3,20-dione,
9α-fluoro-16β-methyl-1,4-pregnadiene-11β,17α,21-triol-3,20-dione,
9α-chloro-16α-methyl-1,4-pregnadiene-11β,17α,21-triol-3,20-dione,
9α-chloro-16β-methyl-1,4-pregnadiene-11β,17α,21-triol-3,20-dione,
9α-fluoro-16α-ethyl-1,4-pregnadiene-11β,17α,21-triol-3,20-dione,
9α-fluoro-16β-ethyl-1,4-pregnadiene-11β,17α,21-triol-3,20-dione,
9α-fluoro-16α-butyl-1,4-pregnadiene-11β,17α,21-triol-3,20-dione,
9α-fluoro-16β-butyl-1,4-pregnadiene-11β,17α,21-triol-3,20-dione, and the like.

Those compounds of our invention having only one double bond in ring A, in the Δ⁴ position, are prepared by partial hydrogenation of the corresponding Δ¹,⁴ compounds or from ring A saturated intermediates as described in the schematic flow sheet in Table 2. Among the starting materials which may be used in the process of Table 2 may be mentioned 3α-acetoxy-16-pregnene-11,20-dione, 3α-acetoxy-16-allopregnene-11,20-dione and the like.

The details of the reactions shown in Tables 1 and 2 are to be found in the examples.

Compounds of our invention having higher 16-alkyl groups are obtained by using, in the above-described synthesis, in place of diazomethane, other diazo alkanes such as diazoethane, diazopropane, diazobutane and the like to form the corresponding pyrazoline compounds which upon heating at about 180° C. are converted to the corresponding 16 - alkyl - 16-pregnenones. Thus, higher alkyl analogs of the compounds shown in the examples are readily prepared.

Among the compounds which may be prepared and which form part of our invention there may be mentioned 15α-fluoro-11β,17α,21-trihydroxy-16α- or β-methyl Δ⁴-pregnene-3,20-dione;
15α-fluoro-11β,17α,21-trihydroxy-16α- or β-ethyl Δ⁴-pregnene-3,20-dione;
15α-fluoro-11β,17α,21-hydroxy-16α- or β-propyl Δ⁴-pregnene-3,20-dione;
15α-fluoro-11β,17α,21-trihydroxy-16α- or β-butyl Δ⁴-pregnene-3,20-dione;
15α-bromo-11β,17α,21-hydroxy-16α- or β-methyl Δ⁴-pregnene-3,20-dione;
15α-bromo-11β,17α,21-trihydroxy-16α- or β-ethyl Δ⁴-pregnene-3,20-dione;
15α-chloro-11β,17α,21-trihydroxy-16α- or β-methyl Δ⁴-pregnene-3,20-dione;

15α-chloro-11β,17α,21-trihydroxy-16α- or β-methyl Δ⁴-pregnene-3,20-dione;
15α-fluoro-17α,21-dihydroxy-16α- or β-methyl Δ⁴-pregnene-3,11,20-trione;
15α-fluoro-17α,21-dihydroxy-16α- or β-ethyl Δ⁴-pregnene-3,11,20-trione;
15α-bromo-17α,21-dihydroxy-16α- or β-methyl Δ⁴-pregnene-3,11,20-trione;
15α-chloro-17α,21-dihydroxy-16α- or 16β-methyl Δ⁴-pregnene-3,11,20-trione;
9α,15α-difluoro-11β,17α,21-trihydroxy-16α- or 16β-methyl Δ⁴-pregnene-3,20-diones;
9α-fluoro-15α-bromo-11β,17α,21-trihydroxy-16α- or 16β-methyl Δ⁴-pregnene-3,20-diones;
9α-fluoro-15α-chloro-11β,17α,21-trihydroxy-16α- or 16β-methyl Δ⁴-pregnene-3,20-diones;
9α-bromo-15α-fluoro-11β,17α,21-trihydroxy-16α- or 16β-methyl Δ⁴-pregnene-3,20-diones;
9α,15α-difluoro-17α,21-dihydroxy-16α- or 16β-methyl Δ⁴-pregnene-3,11,20-trione;
9α-fluoro-15α-bromo-17α,21-dihydroxy-16α- or 16β-methyl Δ⁴-pregnene-3,11,20-trione;
9α-fluoro-15α-chloro-17α,21-dihydroxy-16α- or 16β-methyl Δ⁴-pregnene-3,11,20-trione;
9α-bromo-15α-fluoro-17α,21-dihydroxy-16α- or 16β-methyl Δ⁴-pregnene-3,11,20-trione;
15α-fluoro-11β,17α,21-trihydroxy-16α- or 16β-methyl Δ¹,⁴-pregnadiene-3,20-dione;
15α-bromo-11β,17α,21-trihydroxy-16α- or 16β-methyl Δ¹,⁴-pregnadiene-3,20-dione;
15α-chloro-11β,17α,21-trihydroxy-16α- or 16β-methyl Δ¹,⁴-pregnadiene-3,20-dione;
15α-fluoro-17α,21-dihydroxy-16α- or 16β-methyl Δ¹,⁴-pregnadiene-3,11,20-trione;
15α-bromo-17α,21-dihydroxy-16α- or 16β-methyl Δ¹,⁴-pregnadiene-3,11,20-trione;
15α-chloro-17α,21-dihydroxy-16α- or 16β-methyl Δ¹,⁴-pregnadiene-3,11,20-trione;
9α,15α-difluoro-11β,17α,21-trihydroxy-16α or 16β-methyl Δ¹,⁴-pregnadiene-3,20-dione;
9α-fluoro-15α-chloro-11β,17α,21-trihydroxy-16β- or 16α-methyl Δ¹,⁴-pregnadiene-3,20-dione;
9α-bromo-15α-fluoro-11β,17α,21-trihydroxy-16α- or 16β-methyl Δ¹,⁴-pregnadiene-3,20-dione;
9α,15α-difluoro-17α,21-dihydroxy-16α- or 16β-methyl Δ¹,⁴-pregnadiene-3,11,20-trione;
9α-fluoro-15α-bromo-17α,21-dihydroxy-16α- or 16β-methyl Δ¹,⁴-pregnadiene-3,11,20-trione;
9α-fluoro-15α-chloro-17α,21-dihydroxy-16α- or 16β-methyl Δ¹,⁴-pregnadiene-3,11,20-trione;
9α-bromo-15α-fluoro-17α,21-dihydroxy-16α- or 16β-methyl Δ¹,⁴-pregnadiene-3,20-trione as well as the 21 formates, acetates, propionates, and butyrates of all these and similar compounds.

The 15-halo-16-alkyl steroids, which possess extremely high anti-inflammatory activity, may be administered orally, parenterally or topically. Thus, the active ingredient can be administered alone or may be associated with a carrier. A smaller quantity of the active 15-halo-16-alkyl steroid may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

TABLE 1

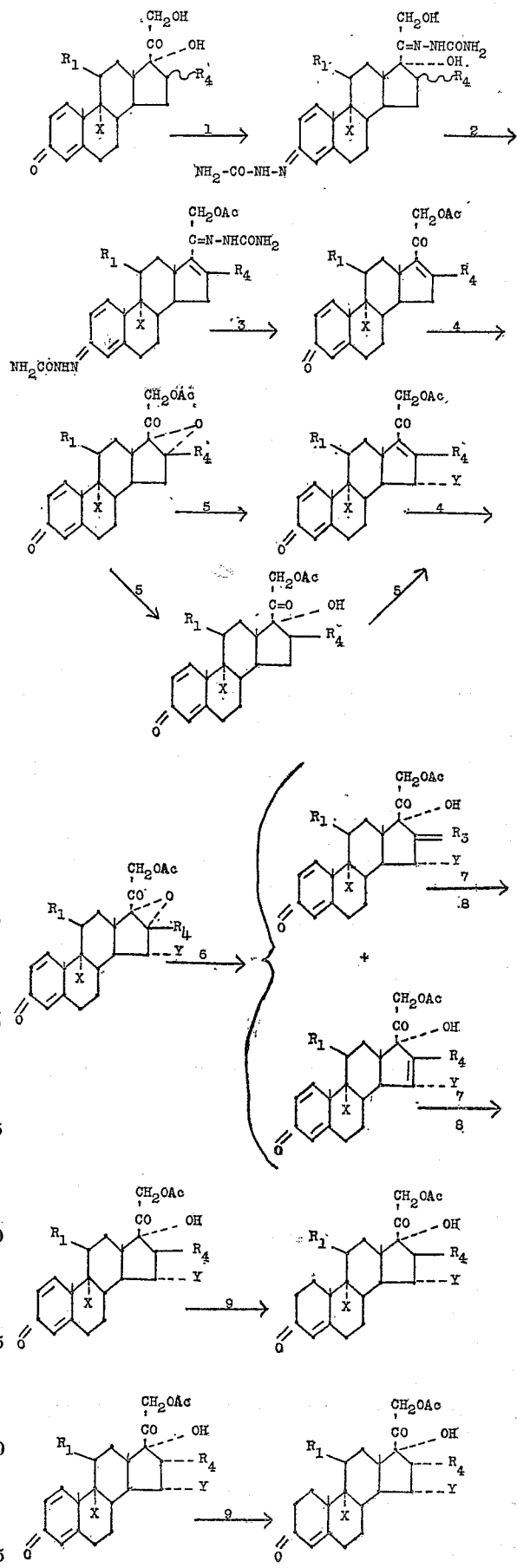

Definitions:

R₁=keto or β-hydroxyl
Ac=acetyl
R₄=alkyl
R₃=alkylidene of same number of carbons as R₄
X=H or halogen
Y=halogen Reagents:

(1) Semicarbazide base plus hydrochloride
(2) Acetic acid plus acetic anhydride (other alkanoyl halides and anhydrides give the other alkanoyl derivatives)
(3) Hot aqueous acetic acid
(4) Organic peracid
(5) BF₃ or HF in tetrahydrofuran (Y=F) HBr or HCl in acetic acid (Y=Br or Cl)
(6) Strong acid (HBr, HCl, HF, HClO₄, CF₃COOH)
(7) Catalytic hydrogenation
(8) Reintroduction of ring A double bonds—SeO₂— or bromination-dehydrobromination
(9) Partial hydrogenation

TABLE II

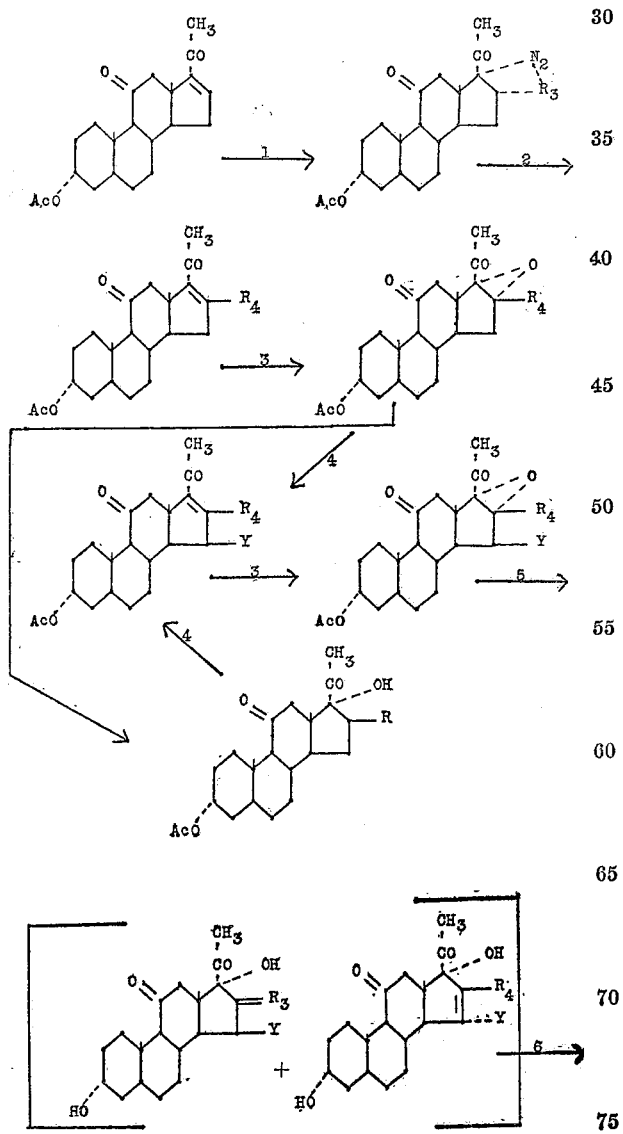

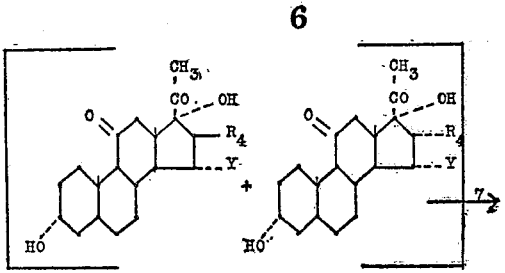

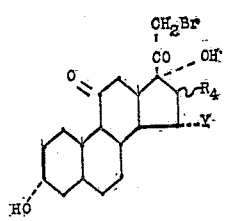

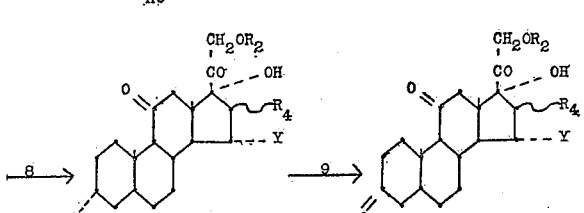

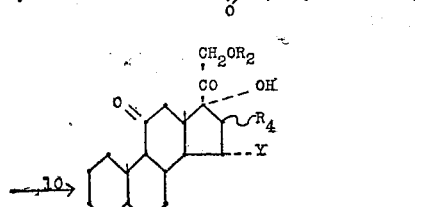

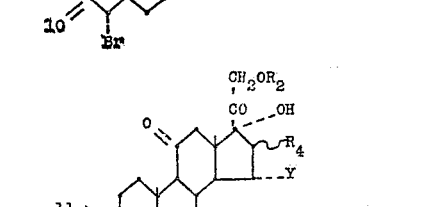

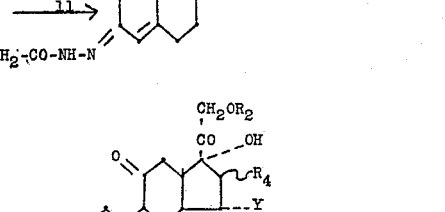

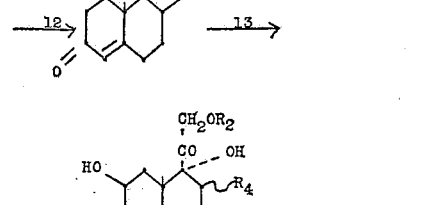

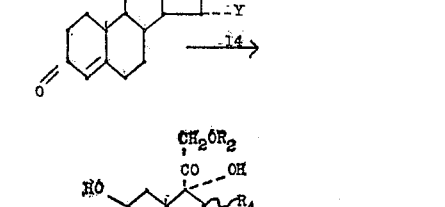

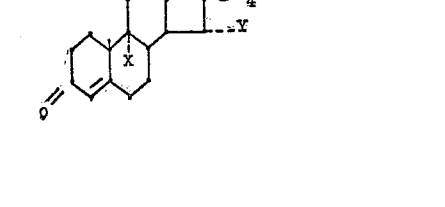

Definitions:

R₁=keto or β-hydroxyl
R₂=lower alkanoyl
R₃=alkylidene
R₄=α or β alkyl of same number of carbons as R₃
R₅=keto or β-acetoxy
Ac=acetyl Reagents:
(1) Diazoalkane
(2) Heat
(3) Peroxide oxidation-alkaline H₂O₂ or alkyl-hydroperoxide plus base or an organic peracid
(4) BF₃ or HF in tetrahydrofuran (Y=F) HBr or HCl in acetic acid (Y=Br or Cl)
(5) Strong acid (HBr, HCl, HF or HClO₄)
(6) H₂ reduction over Pd catalyst
(7) Br₂ in CHCl₃
(8) KI+KOR₂+R₂OH in acetone
(9) Na₂Cr₂O₇
(10) Br₂
(11) Semicarbazide
(12) Aqueous acetic and pyruvic acids
(13) Reduction of 11-carbonyl group via the disemicarbazone procedure
(14) Introduction of 9α-halogen by standard procedures Our invention can be illustrated by the following examples:

*Example 1*

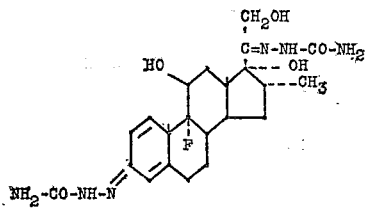

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α-fluoro-11β,17α,21-trihydroxy-16α-methyl-1,4 - pregnadiene-3,20-dione is filtered, washed with water, and dried.

In a similar manner are prepared the 3,20-disemicarbazone of 9α - fluoro-11β,17α,21-trihydroxy-16β-methyl-1,4-pregnadiene-3,20-dione, 3,20-disemicarbazone of 11β,17α,21-trihydroxy-16α-methyl-1,4-pregnadiene-3,20-dione; 3,20-disemicarbazone of 11β,17α,21-trihydroxy-16β-methyl-1,4-pregnadiene-3,20 - dione; 3,20 - disemicarbazone of 17α,21-dihydroxy - 16α - methyl-1,4-pregnadiene-3,11,20-trione and the 3,20 - disemincarbazone of 17α,21 - dihydroxy-16β-methyl-1,4-pregnadiene-3,11,20-trione.

*Example 2*

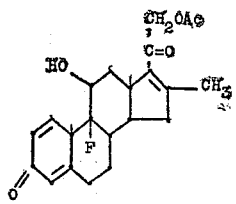

A solution of 500 mg. of the 3,20-disemicarbazone of 9α-fluoro-11β,17α,21-trihydroxy-16α-methyl-1,4 - pregnadiene-3,20-dione in 10 ml. of acetic acid and 0.5 ml. of acetic anhydride is refluxed under nitrogen for one hour to produce the corresponding 3,20-disemicarbazone of 11β,21 - dihydroxy-16-methyl-1,4,16-pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy-16-methyl-1,4,16-pregnatriene-3,20-dione 21-acetate.

Similar treatment of the 3,20-disemicarbazone of 9α-fluoro-11β,17α,21-trihydroxy-16β-methyl-1,4-pregnadiene-3,20-dione also leads to 9α-fluoro-11β-21-dihydroxy-16-methyl-1,4,16-pregnatriene-3,20-dione 21-acetate.

In a similar manner 11β,21-dihydroxy-16-methyl-1,4,16-pregnatriene-3,20-dione 21-acetate; and 21-hydroxy-16-methyl-1,4,16-pregnatriene-3,11,20 - trione 21 - acetate 9α-fluoro-11β,21-dihydroxy-16-methyl-4,16 - pregnadiene-3,20-dione 21-acetate; 11β,21-dihydroxy-16-methyl-4,16-pregnadiene-3,20-dione 21 - acetate and 21 - hydroxy-16-methyl-4,16-pregnadiene-3,11,20-trione 21-acetate are obtained by starting with the appropriate 3,20-disemicarbazone in the above procedure.

*Example 3*

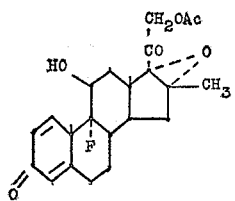

To a stirred solution of 500 mg. of 9α-fluoro-11β,21-dihydroxy-16-methyl-1,4,16-pregnatriene-3,20 - dione 21-acetate in 15 ml. of methylene chloride at 0° C. are added 8 g. of disodium hydrogen phosphate and 2 ml. of 2 M peroxytrifluoroacetic acid in methlene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives 9α-fluoro-11β,21-dihydroxy-16β-methyl-16α,17α-oxido-1,4-pregnadiene-3,20 - dione 21-acetate.

In a similar manner are prepared 11β,21-dihydroxy-16β-methyl-16α,17α-oxido-1,4-pregnadiene-3,20-dione 21-acetate; 21-hydroxy-16β-methyl-16α,17α-oxido-1,4 - pregnadiene-3,11,20-trione 21-acetate; 9α-fluoro-11β,21-dihydroxy-16β-methyl-16α,17α-oxido-4-pregnene - 3,20 - dione 21-acetate; 11β,21-dihydroxy-16β-methyl-16α,17α-oxido-4-pregnene-3,20-dione 21-acetate, and 21-hydroxy-16β-methyl-16α,17α-oxido-4-pregnene-3,11,20 - trione 21-acetate.

*Example 4*

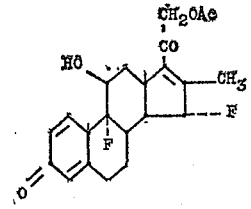

To a mixture of 325 mg. of 9α-fluoro-11β,21-dihydroxy-16β-methyl-16α,17α-oxido, 1,4-pregnadiene-3,20-dione 21-acetate in 1.5 ml. of tetrahydrofuran at −60° C. in a polyethylene centrifuge tube there is added 1.77 ml. of 2–1 by weight mixture of hydrogen fluoride in tetrahydrofuran. The mixture is kept for 2.5 hours at 15–20° C.

It is then poured into an excess (about 25 ml.) of cold 5% aqueous sodium carbonate and 25 ml. of chloroform. The chloroform is separated and washed with water followed by saturated sodium chloride solution. The chloroform solution is then dried over magnesium sulfate and the solvent is removed under a vacuum. The residue is placed on six sheets of Whatman #3 filter paper (6" x 20") using formamide as the stationary phase and benzene as the eluting phase. The paper is dried and the appropriate band is cut out. The desired product is then extracted from this band with methanol. The solvent is evaporated under a vacuum and the product is recrystallized from acetone and ether.

To a stirred solution of 850 mg. of the above 16α,17α-oxide in 10 ml. of acetic acid kept at 15° is added 10 ml. of 7% hydrogen chloride in acetic acid. After 15 minutes 50 ml. of water is added, the precipitate filtered, washed with water and dried in air. The product is a mixture of 9α-fluoro-16-methyl-1,4,15-pregnatriene-11β, 17α,21-triol-3,20-dione 21-acetate and 9α-fluoro-16-methylene-1,4-pregnadiene-11β,17α,21-triol-3,20-dione 21-acetate, which is separated into its components by chromatography on Whatman #3 paper as described under Example 8. Treatment of the 1,4,15-pregnatriene with hydrogen fluoride as described above for the 16α,17α-oxide results in the formation of 9α,15α-difluoro-16-methyl-1,4,16 - pregnatriene - 11,21 - diol - 3,20-dione 21-acetate in higher yield than from the 16α,17α-oxide directly.

When there is substituted for the oxido steroid used above as the starting material an equivalent quantity of 11β,21-dihydroxy-16β-methyl-16α,17α - oxido-1,4-pregnadiene-3,20-dione 21-acetate; 21 - hydroxy - 16β-methyl-16α,17α-oxido-1,4-pregnadiene-3,11,20 - trione - 21-acetate; 9α-fluoro-11β,21-dihydroxy - 16β-methyl - 16α,17α-oxido-4-pregnene-3,20 - dione 21 - acetate; 11β,21-dihydroxy-16β-methyl-16α,17α-oxido-4 - pregnene-3,20-dione 21-acetate or 21-hydroxy-16β-methyl - 16α,17α-oxido-4-pregnene-3,11,20-trione 21-acetate, the corresponding 15-fluoro steroid is obtained

*Example 5*

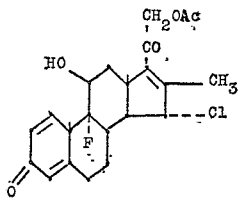

To a solution of 5.00 grams of 9α-fluoro-11β,21-dihydroxy - 16β-methyl - 16α,17α - oxido-1,4 - pregnadiene-3,20-dione 21-acetate (product of Example 3) in 25 ml. of acetic acid there is added 25 ml. of 5% hydrogen chloride in acetic acid. The mixture is stirred 4 hours at 25° C. The solution is then concentrated to dryness in vacuo and the residue is flushed several times with benzene. The residue is subjected to partition chromatography on 200 g. of Celite with formamide as the stationary phase and benzene as the eluting phase. 9α-fluoro-15-chloro-16-methyl - 11β,21 - dihydroxy - 1,4,16-pregnatriene-3,20-dione 21-acetate is obtained as the first substance eluted from the column and is crystallized from acetone ether.

When there is substituted for the oxido steroid used above as the starting material an equivalent quantity of 11β,21-dihydroxy-16α,17α - oxido-1,4 - pregnadiene-3,20-dione 21-acetate; 21-hydroxy-16β-methyl-16α,17α-oxido 1,4-pregnadiene-3,11,20-trione 21-acetate; 9α-fluoro-11β, 21-dihydroxy-16α-methyl - 16α,17α-oxido - 4-pregnene-3, 20-dione 21-acetate; 11β,21 - dihydroxy - 16β-methyl-16α, 17α-oxido-4 - pregnene - 3,20-dione 21-acetate, or 21-hydroxy-16β-methyl-16α,17α-oxido - 4-pregnene - 3,11,20-trione 21 acetate, the corresponding 15-chloro steroid is obtained.

*Example 6*

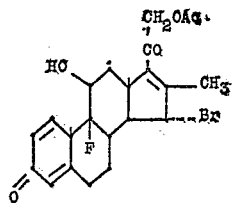

To a stirred solution of 5.05 g. of 9α-fluoro-11β,21-dihydroxy-16β-methyl - 16α,17α-oxido - 1,4 - pregnadiene-3,20-dione 21-acetate in 75 ml. of acetic acid maintained at 10–15° C., there is added 25 ml. of cold 15% hydrogen bromide in acetic acid. After 35 minutes, the mixture is concentrated to dryness in vacuo and the residue is chromatographed on 200 g. of neutral alumina. From the petroleum ether-benzene eluates, there is obtained 9α-fluoro-15α-bromo-16 - methyl - 11α,21 - dihydroxy-1,4, 16-pregnatriene-3,20-dione 21-acetate, crystallized from acetone-ether.

When there is substituted for the oxido steroid used above as the starting material an equivalent quantity of 11β,21-dihydroxy-16α,17α - oxido - 1,4-pregnadiene-3, 20-dione 21-acetate; 21-hydroxy - 16β-methyl - 16α,17α-oxido-1,4 - pregnadiene - 3,11,20 - trione 21-acetate; 9α-fluoro-11β,21-dihydroxy - 16β-methyl - 16α,17α - oxido-4-pregnene-3,20-dione 21-acetate; 11β,21 - dihydroxy-16β-methyl-16α,17α-oxido - 4-pregnene-3,20-dione 21-acetate or 21-hydroxy - 16β - methyl-16α,17α-oxido-4-pregnene-3, 11,20-trione 21-acetate, the corresponding 15-bromo steroid is obtained.

*Example 7*

To a well-stirred solution of 2.00 g. of 16-methyl-9α,15α-difluoro-1,4,16 - pregnatriene - 11β,17α,21 - trihydroxy-3,20-dione 21-acetate in 60 ml. of methylene chloride is added 30 g. of disodium hydrogen phosphate. The mixture is cooled to 0° and 5 ml. of a 2 molar solution of peroxytrifluoracetic acid in methylene chloride is added through a dropping funnel at a fast dropping rate. The mixture is stirred at 0° for 10 minutes and at 25° for one hour.

Methylene chloride and water are added. The mixture is extracted three times with methylene chloride. The latter extract is washed with water, saturated sodium chloride solution and dried over magnesium sulfate. Removal of the solvent leaves a residue which is crystallized from acetone-ether to give the difluoro-16β-methyl-16α,17α-oxide.

When the 15α-chloro compounds described in Example 5 or the 15α-bromo compounds described in Example 6 are substituted in equivalent quantities for the 15α-fluoro compound used above as a starting material, the corresponding 15α-chloro or bromo-16α,17α-oxido steroid is obtained. Similarly, when any of the other 15α-fluoro steroids obtained in Example 4 are substituted in the above procedure, the corresponding 15α-fluoro-16α,17α-oxido steroid is obtained.

Example 8

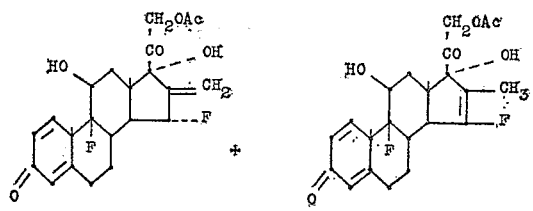

To a stirred solution of 800 mg. of 9α,15α-difluoro-11β,21 - dihydroxy - 16β - methyl - 16α,17α - oxido - 1,4-pregnadiene-3,20-dione-21-acetate (product of Example 7) in 10 ml. of glacial acetic acid at 15° C. is added 10 ml. of 7% hydrogen chloride in acetic acid at 15° C. (Alternatively similar results are obtained with 800 mg. of the starting compound in 5 ml. of acetone and 1 ml. of conc. HCl cooled to 10–15° C.) In either case, after 20 minutes at 10–15° C., water is added and the solid product is filtered, washed with water and dried in air to give a mixture of the corresponding 15-fluoro-Δ15-16-methyl-17α-hydroxy and 15-fluoro-16-methylene-17α-hydroxy steroids. This mixture is separated into its components by chromatography on Whatman #3 filter paper (40 mg. per 6″ x 20″ sheet) utilizing formamide as the stationary phase and chloroform-benzene (1:9) as the mobile phase. The appropriate band (visible under ultraviolet light) is cut out, eluted with methanol, and the methanol is concentrated to dryness in vacuo. Water is added to the residue and the solid is filtered, washed with water and dried in air. Pure crystalline material is obtained in each case by crystallization from ethyl acetate-hexane or acetone-ether, the products being respectively 9α,15α-difluoro-16-methylene-11β,17α,21 - trihydroxy - 1,4 - pregnadiene - 3,20 - dione-21 - acetate and 9α,15 - difluoro - 16 - methyl - 11β,17α,21 - trihydroxy - 1,4,15 - pregnatriene - 3,20 - dione - 21-acetate. When the various 15α-chloro or bromo compounds, formed by the process of Example 7 from the various products of Examples 5 and 6, are substituted for the 15α-fluoro compounds used above as starting materials in the above process, the corresponding 15α-chloro and 15α-bromo compounds are obtained.

Example 9

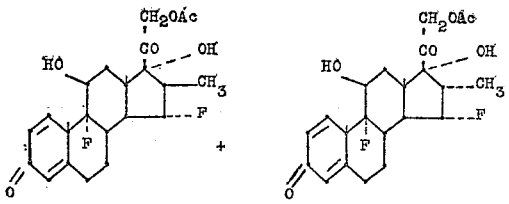

A solution of 500 mg. of the product of Example 8 in 30 ml. of methanol is stirred in hydrogen at 1 atmosphere and 25° over 400 mg. of 5% palladium on charcoal catalyst. Uptake of three equivalents of hydrogen is complete in two hours. The ring A double bonds reduce *before* the ring D 16-methylene or Δ15 double bonds. The reaction mixture is filtered and the filtrate concentrated to dryness in vacuo to give a solid residue consisting of 16α-methyl and 16β-methyl-9α,15α-difluoro-11β,17α,21-trihydroxy-5α and 5β-pregnane-3,20-dione 21-acetates.

To 500 mg. of the mixture produced in the preceding paragraph in 30 ml. of t-amylalcohol and 0.1 ml. of acetic acid is added 500 mg. of selenium dioxide and 500 mg. of mercury. The mixture is stirred and refluxed under nitrogen for 18 hours. 500 mg. of selenium dioxide is then added and the mixture is refluxed an additional 24 hours. The mixture is filtered and the filtrate is evaporated to dryness. The residue is taken up in ethyl acetate and washed with dilute aqueous sodium hydroxide and water and dried over magnesium sulfate. It is then treated with activated charcoal, filtered, and the filtrate evaporated to dryness. The residue is separated into 16α-methyl-9α,15α-difluoroprednisolone 21-acetate and 16β-methyl-9α,15α-difluoroprednisolone 21-acetate by paper chromatography as described under Example 8.

The 21-acetates are hydrolyzed to the free 21-alcohols by treating 1.0 g. of compound with 30 ml. of methanol and 1 g. of KHCO$_3$ in 10 ml. of water, under nitrogen. The mixture is refluxed 7 minutes, cooled, and neutralized with 1 ml. of acetic acid in 10 ml. of water. The methanol is removed in vacuo and the product is extracted with ethyl acetate. Evaporation of the solvent gives the free 21-hydroxy compound.

When the other compounds produced in Example 8 are used in the above procedure in place of the above starting material, there is obtained the correspondingly substituted 15-halo-16-methyl Δ1,4- steroid. Thus, by the procedures of Examples 1, 2, 3, 4, 5, 6, 7, 8 and 9 there is obtained 15α-bromo-11β,17α,21-trihydroxy-16α and β - methyl - 1,4 - pregnadiene - 3,20 - dione; 15α-chloro - 11β,17α,21 - trihydroxy - 16α and β - methyl-1,4 - pregnadiene - 3,20 - dione; 15α - fluoro - 17α,21-dihydroxy - 16α and β- methyl - 1,4 - pregnadiene - 3, 11,20 - trione; 15α - bromo - 17α,21 - dihydroxy - 16α and β - methyl - 1,4 - pregnadiene - 3,11,20 - trione; 9α,15α - difluoro - 11β,17α,21 - trihydroxy - 16α and β - methyl - 1,4 - pregnadiene - 3,20 - dione; 9α - fluoro-15α-chloro-11β,17α,21-trihydroxy-16β and α-methyl-1,4-pregnadiene - 3,20 - dione; 9α - chloro - 15α - fluoro-11β,17α,21 - trihydroxy - 16α and β - methyl - 1,4-pregnadiene - 3,20 - dione; and 9α,15α - difluoro - 17α, 21-dihydroxy-16α and β-methyl-1,4-pregnadiene-3,11,20-trione.

Example 10

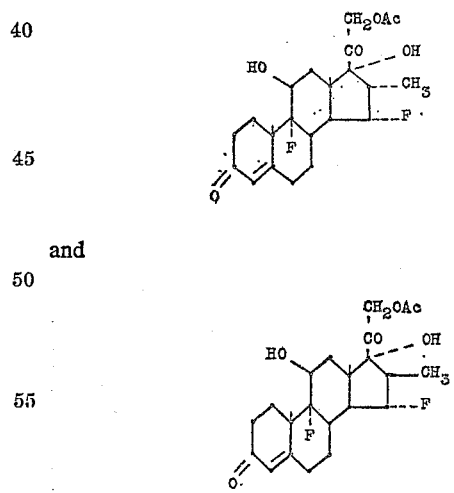

and

A solution of 200 mg. of 16α-methyl-9α,15α-difluoroprednisolone-21-acetate in 20 ml. of ethylacetate is hydrogenated at 25° and 1 atmosphere over 100 mg. of 5% palladium on charcoal catalyst. Following uptake of one mole equivalent of hydrogen the reaction is stopped, the catalyst removed by filtration and the filtrate taken to dryness. The residue consists primarily of Δ4-3-ketone mixed with a minor amount of Δ1-3-ketone. The pure Δ4 - 3 - ketone (16α - methyl - 9α,15α - difluorohydrocortisone 21-acetate) is obtained by crystallization of the residue from ethyl acetate-hexane.

In a similar manner starting with the corresponding 16β-methylprednisolone analog is obtained 16β-methyl-9α,15α-difluorohydrocortisone 21-acetate.

Example 11

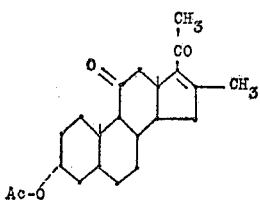

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitroso-tosylamide in 50 ml. of ether is placed in the dropping funnel.

Diazomethane is generated by warming the generation flask to 40–45° C. and cautiously adding the N-methyl-N-nitro-tosylamide-ether from the dropping funnel. Nitrogen is utilized to sweep the diazomethane into a solution of 20 g. of 3α-acetoxy-16-pregnene-11,20-dione in 100 ml. of tetrahydrofuran and 120 ml. ether. The process is continued until the steroid solution remains yellow for several hours. The product, 3α-acetoxy-16α,17α-methyleneazo pregnane-11,20-dione largely precipitates from the reaction mixture. After 16 hours, the mixture is filtered, washed with ether and dried in air.

37.4 g. of 3α-acetoxy-16α,17α-methylneneazo-pregnane-11,20-dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It is taken up in about 150 ml. of acetone, filtered through diatomaceous earth, concentrated to about 100 ml., and ether is slowly added to the boiling solution until crystallization occurs. The product is 3α-acetoxy-16-methyl-16-pregnene-11,20-dione.

Similarly, when 3α-acetoxy-16-allopregnene-11,20-dione is used in place of the acetoxy pregnene-dione, the corresponding acetoxy-16-methyl-16-allopregnene is obtained.

Example 12

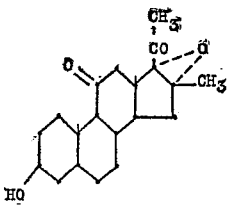

A solution of 20.0 g. of 3α-acetoxy-16-methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultra-violet maximum at 249 has completely disappeared. Then 600 ml. of saturated salt water is slowly added, the crystalline precipitate is filtered, washed with water, and dried in air and in vacuum. The product is 16α,17α-epoxy-3α-hydroxy-16β-methyl-pregnane-11,20-dione which is acetylated at C–3 by treatment with 10 ml. of acetic anhydride and 20 ml. of pyridine at 25° for 18 hours. The product 16α,17α-epoxy-3α-acetoxy-16β-methyl-pregnane - 11,20-dione is isolated by addition of water. It is filtered, washed with water and dried in air.

When the acetoxy-16-methyl-16-allopregnene is used instead of the pregnene above, the corresponding 16α,17α-oxide is obtained.

Example 13

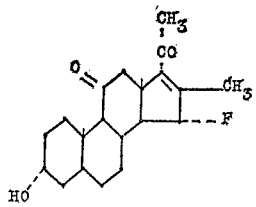

The procedure of Example 4 is followed using the product of Example 12 in place of the product of Example 3 to give the product of the above formula.

When the 16α,17α-epoxy-allopregnene is used, the corresponding 15-fluoro-16-allopregnene is obtained.

Example 14

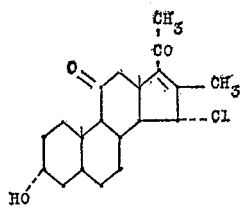

The procedure of Example 5 is followed using the product of Example 12 in place of the product of Example 3 to give the product of the above formula. Similarly the corresponding chloro-allopregnene is obtained by starting with the corresponding epoxy-allopregnane.

Example 15

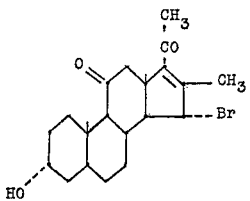

The procedure of Example 6 is followed using the product of Example 12 in place of the product of Example 3 to give the product of the above formula. Similarly, the corresponding bromo-allopregnene is obtained from the epoxy-allopregnane.

Example 16

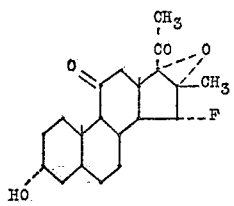

The procedure of Example 7 is followed using the product of Example 13 in place of the product of Example 4 to give the compound of the above formula. Similarly, the corresponding 15-halo-16,17-epoxyallopregnanes are obtained.

When the products of Examples 14 and 15 are used in the procedure of Example 7 in place of the product of Example 4, the corresponding 15-bromo and 15-chloro compounds are obtained.

Example 17

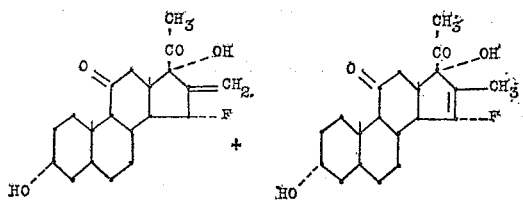

To 2.70 g. of the product of Example 16 in 50 ml. of dioxane is added 27 ml. of 2 M aqueous perchloric acid. After 65 hours at 25° water is added and the mixture is extracted with methylene chloride. The organic extract is washed with aqueous potassium bicarbonate saturated sodium chloride, dried over magnesium sulfate, and concentrated to dryness in vacuo. The product is a mixture of 16-methylene and $\Delta^{15}$-16-methyl compounds of the above formula.

The corresponding 15-bromo and 15-chloro compounds are obtained in the same way from the corresponding bromo and chloro starting materials. When the allopregnanes of Example 16 are used, the correspondingly substituted products are obtained.

Example 18

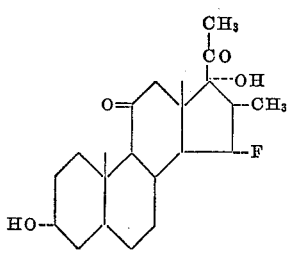

and

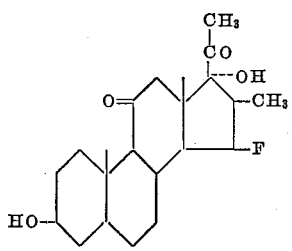

A solution of 2.60 g. of the olefin mixture produced in Example 17 in 50 ml. of ethyl acetate is hydrogenated at 1 atom pressure and 25° over 1.0 g. of platinium oxide catalyst. Following uptake of 1 ml. equivalent of hydrogen the catalyst is filtered and the filtrate taken to dryness. Chromatography of the residue on 250 g. of Florisil serves to separate the product into 16α-methyl-15α-fluoro-3α,17α-dihydroxypregnene-11,20-dione and its 16β-methyl epimer. The corresponding 15-chloro and bromo compounds and the 15-halo allopregnanes are obtained similarly.

Example 19

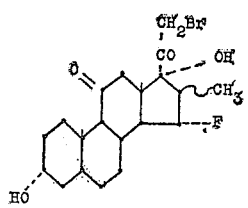

To a stirred solution of 1.60 g. of 16α-methyl-15α-fluoro-3α,17α-dihydroxy-pregnane-11,20-dione (the product of Example 18) in 32 ml. of chloroform, maintained at 30–35° C., is slowly added 840 mg. of bromine in 48 ml. of chloroform. Uptake of bromine is complete within 3 hours. Ether is added and the mixture washed twice with cold 5% potassium bicarbonate solution. The organic extract is dried over magnesium sulfate and the residue crystallized from acetone-ether to give 16α-methyl - 15α - fluoro - 21 - bromo - 3α,17α - dihydroxy - pregnane-11,20-dione. The 16β-methyl epimer is prepared similarly.

When any of the other products prepared by Example 18 are used in place of the above starting material, the correspondingly substituted 21-bromo compounds are obtained.

Example 20

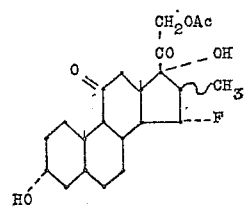

2.05 g. of 16α-methyl-15α-fluoro-21-bromo-3α,17α-dihydroxy-pregnane-11,20-dione (the product of Example 19), 1.58 g. of potassium iodide and 1.96 g. of anhydrous potassium acetate in 40 ml. of acetone and 0.1 ml. of acetic acid are refluxed 17 hours. The mixture is concentrated to dryness in vacuo and partitioned between ethyl acetate and water. The ethyl acetate layer is washed with sodium chloride solution and dried over magnesium sulfate. Crystallization of the product from acetone-ether gives pure 16α-methyl-15α-fluoro-3α,17α,21-trihydroxy-pregnane-11,20-dione 21 acetate. The 16β-methyl epimer is prepared similarly.

When the other compounds prepared in Example 19 are used in place of the above starting material, the correspondingly substituted 21 acetates are obtained.

Example 21

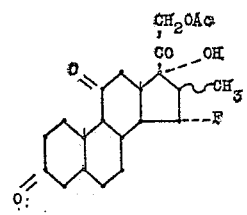

To a solution of 600 mg. of 16α-methyl-15α-fluoro-3α,17α,21-trihydroxy-pregnane-11,20-dione 21-acetate (the product of Example 20) in 16 ml. of acetic acid is added 284 mg. of sodium dichromate in 13 ml. of acetic acid. After 17 hours at 25° C., 50% saturated aqueous sodium chloride solution is slowly added. The precipitated product is filtered, washed with water, dried in air and recrystallized from acetone-ether to give 16α-methyl-15α-fluoro-17α,21-dihydroxy-pregnane-3,11,20-trione  21-acetate. The 16β-methyl epimer is prepared similarly.

When the other products of Example 20 having a 3α-hydroxy group are used in place of the above starting material, the correspondingly substituted 3-keto compounds are obtained.

Example 22

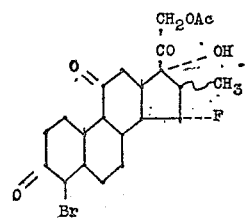

To a stirred solution of 630 mg. of 16α-methyl-15α-fluoro - 17α,21 - dihydroxy - pregnane - 3,11,20 - trione 21-acetate (the product of Example 21) in 10 ml. of acetic acid and 8 ml. of chloroform kept at —10° C. is added 240 mg. of bromine in 6 ml. of chloroform. After addition is complete, 1.2 g. of sodium acetate in 7 ml. of cold water is added. Additional water is added and the mixture is extracted with chloroform. The chloroform extract is washed with dilute potassium bicarbonate, water, and dried over sodium sulfate. The residue is triturated with ether to give crystalline 4-bromo-16α-methyl-15α - fluoro - 17α,21 - dihydroxy - pregnane - 3,11,20-trione 21-acetate. The 16β-methyl epimer is prepared similarly.

When the other products of Example 21 are used in place of the above starting material, the correspondingly substituted 4-bromo compounds are obtained.

*Example 23*

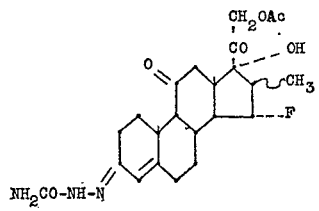

To 580 mg. of 4-bromo-16α-methyl-15α-fluoro-17α,21-dihydroxy-pregnane-3,11,20-trione 21-acetate (the product of Example 22) in 20 ml. of acetonitrile under nitrogen is added a slurry of 300 mg. of semicarbazide hydrochloride and 200 mg. sodium bicarbonate in 4 ml. of water. After 2 hours, the acetonitrile is removed in vacuo, water added and the crystalline 3-semicarbazone of 16α-methyl-15α-fluoro-17α,21-dihydroxy-4-pregnene-3,11,20-trione 21-acetate is filtered, washed with water, and dried in air. The 16β-methyl epimer is prepared similarly.

When any of the other compounds produced in Example 22 are used in equivalent quantity in place of the above starting material, the correspondingly substituted Δ⁴-pregnene 3-semicarbazone is formed.

*Example 24*

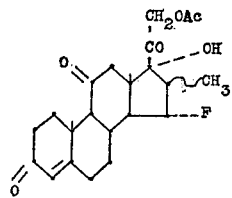

500 mg. of the semicarbonazone of 16α-methyl-15α-fluoro - 17α,21 - dihydroxy-4-pregnene-3,11,20-trione 21-acetate (the product of Example 23) is dissolved in 20 ml. of acetic acid, 1.5 ml. of pyruvic acid and 5 ml. of water. After 18 hours at 25° C., water is added and the mixture is extracted with chloroform. The chloroform extract is washed with aqueous bicarbonate, water, and dried over sodium sulfate. Removal of the solvent gives 16α-methyl-15α-fluoro-17α,21-dihydroxy-4-pregnene-3,11,20-trione 21-acetate which is purified by recrystallization from acetone and ether. The 16β-methyl epimer is prepared similarly. The corresponding 21-alcohols are prepared by treatment with aqueous methanolic potassium bicarbonate as described under Example 9. In a similar manner are obtained the 15-chloro and 15-bromo 16α and 16β-alkyl cortisone derivatives.

When any of the other compounds formed in Example 23 are used in equivalent quantity in place of the above starting material, the correspondingly substituted product is obtained.

*Example 25*

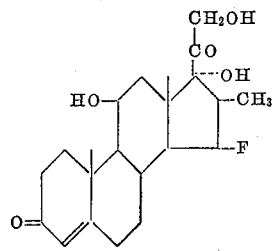

and

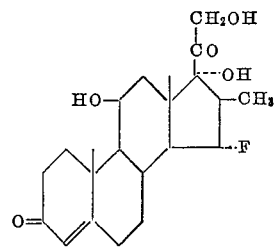

The 11-carbonyl group of the products of Example 24 is converted to an 11β-hydroxyl group by the procedures of N. L. Wendler, Huang-Minlon and M. Tishler, J. Am. Chem. Soc. 73 3818 (1951) and R. E. Jones and S. A. Robinson, J. Org. Chem. 21 586 (1956) in which the 3 and 20-carbonyl groups are protected as the 3,20-bis-semicarbazone, the 11-keto group is reduced by sodium borohydride or lithium borohydride and the semicarbazone protecting groups are removed by treatment with aqueous acetic acid pyruvic acid. Among the products of this sequence of reactions are 16α-methyl-15α-fluorohydrocortisone, 16β-methyl-15α-fluorohydrocortisone and other 16α or 16β-alkyl 15-halo hydrocortisone analogs. The corresponding 21-acetates are prepared by treatment of the 21-alcohols with acetic anhydride and pyridine at 25° for 17 hours.

*Example 26*

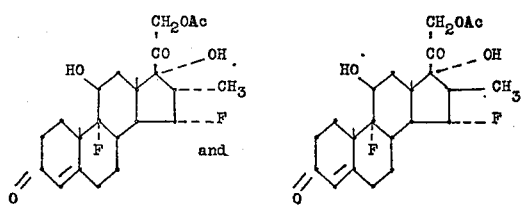

Halogen at position 9 is introduced into the products of Example 25 by the procedures of J. Fried and E. F. Sabo, J. Am. Chem. Soc. 75 2273 (1953) and R. F. Hirschmann, R. Miller, J. Wood and R. E. Jones ibid., 78 4956 (1956) involving formation of the 9,11-olefin, the 11β-hydroxyl-9α-bromo compound, the 9β,11β-oxide and the 11β-hydroxyl-9α-fluoro or 9α-chloro compounds. Among the products of this sequence are 16α-methyl 9α, 15α-difluoro hydrocortisone 21-acetate, 16β-methyl 9α,15α-difluoro hydrocortisone 21-acetate and other 16α and 16β-alkyl 9α,15α-dihalo hydrocortisone analogs. The 21-alcohols are prepared by treatment with aqueous methanolic potassium bicarbonate as described in Example 9. The corresponding 11-ketones are prepared by treatment with sodium dichromate in acetic acid as described under Example 21.

We claim as our invention:
1. Compounds of the formula:

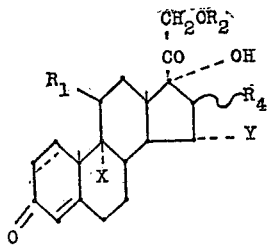

in which $R_1$ is selected from the group consisting of keto and β-hydroxyl, $R_2$ is selected from the group consisting of hydrogen and lower alkanoyl, $R_4$ is selected from the group consisting of α-lower alkyl and β-lower alkyl, X is selected from the group consisting of hydrogen and halogen, Y is selected from the group consisting of fluoro, chloro and bromo, and the dotted line between carbons 1 and 2 indicates that the bond between those carbons is selected from the group consisting of a single and a double bond.

2. 15α-fluoro-16α-methyl-17α,21-dihydroxy-$\Delta^4$-pregnene-3,11,20-trione.
3. 15α-fluoro-16α-methyl-11β,17α,21-trihydroxy-$\Delta^4$-pregnene-3,20-dione.
4. 15α-fluoro-16α-methyl-17α,21-dihydroxy-$\Delta^{1,4}$-pregnadiene-3,11,20-trione.
5. 15α-fluoro-16α-methyl-11β,17α,21-trihydroxy-$\Delta^{1,4}$-pregnadiene-3,20-dione.
6. 9α,15α-difluoro-16α-methyl-17α,21-dihydroxy-$\Delta^4$-pregnene-3,11,20-trione.
7. 9α,15α-difluoro-16α-methyl-11β,17α,21-trihydroxy-$\Delta^4$-pregnene-3,20-dione.
8. 9α,15α-difluoro-16α-methyl-17α,21-dihydroxy-$\Delta^{1,4}$-pregnadiene-3,11,20-trione.
9. 9α,15α-difluoro-16α-methyl-11β,17α,21-trihydroxy-$\Delta^{1,4}$-pregnadiene-3,20-dione.
10. 15α-fluoro-16β-methyl-17α,21-dihydroxy-$\Delta^4$-pregnene-3,11,20-trione.
11. 15α-fluoro-16β-methyl-11β,17α,21-trihydroxy-$\Delta^4$-pregnene-3,20-dione.
12. 15α-fluoro-16β-methyl-17α,21-dihydroxy-$\Delta^{1,4}$-pregnadiene-3,11,20-trione.
13. 15α-fluoro-16β-methyl-11β,17α,21-trihydroxy-$\Delta^{1,4}$-pregnadiene-3,20-dione.
14. 9α,15α-difluoro-16β-methyl-17α,21-dihydroxy-$\Delta^4$-pregnene-3,11,20-trione.
15. 9α,15α-difluoro-16β-methyl-11β,17α,21-trihydroxy-$\Delta^4$-pregnane-3,20-dione.
16. 9α,15α-difluoro-16β-methyl-17α,21-dihydroxy-$\Delta^{1,4}$-pregnadiene-3,11,20-trione.
17. 9α,15α-difluoro-16β-methyl-11β,17α,21-trihydroxy-$\Delta^{1,4}$-pregnadiene-3,20-dione.

18. A process of preparing compounds of the structure:

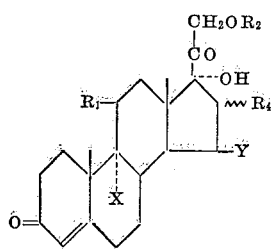

in which $R_1$ is selected from the group consisting of keto and β-hydroxyl, $R_2$ is selected from the group consisting of hydrogen and lower alkanoyl, $R_4$ is selected from the group consisting of α-lower alkyl and β-lower alkyl, X is selected from the group consisting of hydrogen and halogen and Y is selected from the group consisting of fluoro, chloro and bromo, which comprises, starting with a 3-β-hydroxy-16-alkyl-16α,17α-epoxy-pregnane-11, 20-dione, agitating said pregnane dione with a hydrogen halide until formation of the 15-halo-16-alkyl-$\Delta^{16}$ derivative is substantially complete and isolating said 15 halo compound, agitating said 15-halo-16-alkyl-$\Delta^{16}$-steroid in an inert solvent with a peracid until formation of the 16α,17α-epoxy-15-halo-16-methyl compound is substantially complete, agitating the said 16α,17α-epoxy-15-halo steroid with dilute aqueous acid until formation of the mixture of 15 - halo - 16 - alkylidene - 17α - hydroxy and 15-halo-16-alkyl-17α-hydroxy-$\Delta^{15}$ steroids is substantially complete, isolating said mixture and reducing it at 1 atmosphere pressure by agitating it in an inert solvent with hydrogen and a hydrogenation catalyst, to form a mixture of 15-halo-16α and β-alkyl 3β,17α dihydroxy pregnane 11,20 dione compounds and separating the 16 α and β epimers.

19. A process of preparing compounds of the structure:

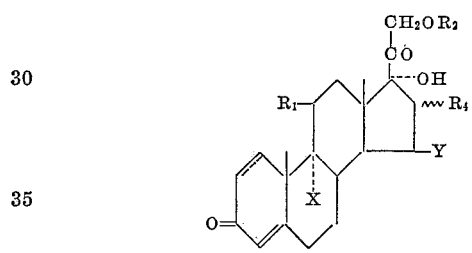

wherein $R_1$ is selected from the group consisting of keto and β-hydroxyl, $R_2$ is selected from the group consisting of hydrogen and lower alkanoyl, $R_4$ is selected from the group consisting of α-lower alkyl and β-lower alkyl, X is selected from the group consisting of hydrogen and halogen, Y is selected from the group consisting of fluoro, chloro and bromo, and the dotted line between carbons 1 and 2 indicates the bond between those carbons is selected from the group consisting of a single and a double bond, which comprises agitating an alcoholic solution of a starting material selected from the group consisting of a mixture of the corresponding 11-oxygenated-15-halo-16-alkylene-17α-hydroxy-3,20-diketo and 11-oxygenated-15-halo - 16 - methyl - $\Delta^{15}$ - 17α - hydroxy - 3,20 - diketo steroid 21-esters of the pregnane series and the individual components of said mixture in an atmosphere of hydrogen under pressure until three mole-equivalents of hydrogen are absorbed, isolating the resulting mixture of the corresponding 15-halo-16α and 16β-alkyl steroid 21-esters, reoxidizing the ring A to a $\Delta^{1,4}$ steroid by heating the said 16α and β alkyl steroid-21-esters with an oxidizing agent in an inert solvent to reflux until the oxidation is substantially complete, and separating the said 16α and 16β-alkyl steroid 21-esters.

20. A process of preparing 15-halo-16-alkyl-$\Delta^{16}$-20-ketopregnenes which comprises bringing into reactive contact a 16α,17α-oxido-16β-alkyl steroid of the pregnane series and a hydrogen halide.

No references cited.